(12) United States Patent
Yamada et al.

(10) Patent No.: US 8,164,997 B2
(45) Date of Patent: Apr. 24, 2012

(54) OPTICAL DISC APPARATUS FOR CONDUCTING INFORMATION RECORDING OR REPRODUCTION ON AN OPTICAL DISC

(75) Inventors: Kenichiro Yamada, Chigasaki (JP); Takeyoshi Kataoka, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/769,501

(22) Filed: Apr. 28, 2010

(65) Prior Publication Data

US 2011/0096647 A1  Apr. 28, 2011

(30) Foreign Application Priority Data

Oct. 23, 2009  (JP) .................................. 2009-243978

(51) Int. Cl.
G11B 11/00  (2006.01)

(52) U.S. Cl. ........................................ 369/53.14; 369/94

(58) Field of Classification Search ........................ None
See application file for complete search history.

(56) References Cited

U.S. PATENT DOCUMENTS

| | | |
|---|---|---|
| 2002/0195540 A1 | 12/2002 | Higuchi |
| 2005/0063259 A1 | 3/2005 | Isshiki et al. |
| 2006/0104183 A1 | 5/2006 | Kataoka et al. |
| 2006/0158993 A1 | 7/2006 | Komma et al. |
| 2006/0221782 A1 | 10/2006 | Kanenaga |
| 2007/0070843 A1 | 3/2007 | Kobayashi |
| 2009/0154324 A1* | 6/2009 | Sato et al. ................. 369/112.23 |
| 2009/0180364 A1* | 7/2009 | Kato et al. ................... 369/47.15 |
| 2010/0074069 A1* | 3/2010 | Iijima et al. ................ 369/44.32 |

FOREIGN PATENT DOCUMENTS

| | | |
|---|---|---|
| JP | 2002-157750 A | 5/2002 |
| JP | 2003-077142 A | 3/2003 |
| JP | 2003-346369 A | 5/2003 |
| JP | 2005-100483 A | 4/2005 |
| JP | 2006-139841 A | 6/2006 |
| JP | 2006-286132 A | 10/2006 |
| JP | 2007-095142 A | 4/2007 |
| JP | 2007-164927 A | 6/2007 |

* cited by examiner

*Primary Examiner* — Paul Huber
(74) *Attorney, Agent, or Firm* — Kilpatrick Townsend & Stockton LLP

(57) ABSTRACT

An optical disc apparatus including means for calculating a spherical aberration correction quantity of an object lens, reproduced information signal generation means and spherical aberration correction means conducts spherical aberration correction, finds a spherical aberration correction quantity suitable for another layer by calculation on the basis of the obtained spherical aberration correction quantity, and sets the correction quantity as an initial correction quantity of spherical aberration correction. An optical disc apparatus including tilt correction quantity calculation means, reproduced information signal generation means and tilt adjustment means conducts tilt adjustment, finds a tilt correction quantity suitable for another layer by calculation on the basis of the obtained tilt correction quantity, and sets the correction quantity as an initial correction quantity of tilt adjustment.

6 Claims, 9 Drawing Sheets

FIG.10

| DISC NAME | CALCULATION LAYER | REFERENCE LAYER |
|---|---|---|
| OPTICAL DISC A | AT LEAST ONE UNRECORDED LAYER J (UNRECORDED LAYER OR ADDITIONALLY RECORDABLE LAYER) | AT LEAST ONE ALREADY RECORDED LAYER X (PARTIALLY RECORDED LAYER OR REPRODUCTION DEDICATED LAYER) |
| OPTICAL DISC B | AT LEAST ONE UNRECORDED LAYER K (PARTIALLY RECORDED LAYER) | AT LEAST ONE ALREADY RECORDED LAYER Y (WHOLLY RECORDED LAYER OR REPRODUCTION DEDICATED LAYER) |
| OPTICAL DISC C | AT LEAST ONE UNRECORDED LAYER J (UNRECORDED LAYER OR ADDITIONALLY RECORDABLE LAYER) | AT LEAST ONE ALREADY RECORDED LAYER Y (WHOLLY RECORDED LAYER OR REPRODUCTION DEDICATED LAYER) |
| OPTICAL DISC D | AT LEAST TWO UNRECORDED LAYERS J (UNRECORDED LAYER OR ADDITIONALLY RECORDABLE LAYER) | AT LEAST TWO ALREADY RECORDED LAYERS Y (WHOLLY RECORDED LAYER OR REPRODUCTION DEDICATED LAYER) |

OPTICAL DISC APPARATUS FOR CONDUCTING INFORMATION RECORDING OR REPRODUCTION ON AN OPTICAL DISC

INCORPORATION BY REFERENCE

The present application claims priority from Japanese application JP2009-243978 filed on Oct. 23, 2009, the content of which is hereby incorporated by reference into this application.

BACKGROUND OF THE INVENTION

The present invention relates to an optical disc apparatus. As an example, the present invention relates to a method for spherical aberration correction and tilt correction in an optical disc apparatus.

There are documents described below as documents concerning the spherical aberration correction in the optical disc apparatus.

For example, in Abstract in JP-A-2007-157750, there is a description "in a multilayer optical disc including at least a first recording layer and a second recording layer" "a change of a correction quantity of spherical aberration from a value suitable for the first recording layer to a predetermined value is started before movement from the first recording layer to the second layer is completed."

For example, in Abstract in JP-A-2006-139841, there is a description "if an attached optical disc is in an unrecorded state, the spherical aberration correction quantity and the focus offset quantity of an object lens are adjusted on the basis of a push-pull signal and predetermined data is recorded on the optical disc. In addition, the spherical aberration correction quantity in a spherical aberration correction element in an optical pickup and a focus offset quantity of the object lens are adjusted on the basis of a reproduced signal obtained from the recorded predetermined data."

For example, in Abstract in JP-A-2007-164927, there is a description "an object lens 26 is displaced continuously from a lower limit position in a displaceable range toward an upper limit position according to an object lens movement signal. Distances D1, D2 and D3 between a surface L0 of a cover layer and respective recording layers L1, L2 and L3 are calculated by using a focus error signal at the time of displacement of the object lens 26. Spherical aberration correction quantities R1, R2 and R3 respectively associated with distances D1, D2 and D3 are stored."

For example, in Abstract in JP-A-2003-346369, there is a description "if a disc is a CD/DVD-ROM or a recorded CD-R/RW or DVD-R/RW, jitter is measured intermittently and tilt correction of an object lens is conducted. If the disc is an unrecorded or a partially recorded CD-R/RW or DVD-R/RW, a warp of the disc is detected from a push-pull error signal and a wobbling signal to conduct tilt correction of an object lens."

SUMMARY OF THE INVENTION

As optical discs having an increased density, multilayer optical discs each having a plurality of recording layers, such as DVDs, BDs (Blu-ray Discs) and HD-DVDs, are typically known. In respective recording layers of the multilayer optical disc, each recording surface is covered by a protection layer formed of a transparent material to prevent the recording layer from being subjected to thermal deformation or oxidation by irradiation with laser light. When respective recording layers of the multilayer optical disc are irradiated with laser light, the thickness of the protection layer through which the laser light is transmitted differs from recording layer to recording layer and consequently different spherical aberrations are contained in reflected light obtained by reflection at respective recording layers. The spherical aberration becomes great in proportion to the fourth power of the numerical aperture NA of the object lens. If the spherical aberration becomes great, a bad influence is exerted upon focus control (focus servo control) of the object lens for respective recording layers. Therefore, it is necessary to exclude the spherical aberration from the reflected light. In an optical disc recording-reproducing apparatus in which a multilayer optical disc is irradiated with laser light via an object lens having a large numerical aperture NA to record or reproduce a signal, therefore, a spherical aberration correction mechanism is provided to correct spherical aberration contained in reflected light reflected by each recording layer.

For implementing a high recording density in the optical disc, it is necessary to implement a high signal quality even under the existence of dispersion of individuals in the optical disc media and optical disc recording-reproducing apparatuses. Dispersion in positional relation between the optical head and the optical disc medium is pointed out especially as characteristic changes caused in the reproduced information signal by the spherical aberration, defocus, off-track (deviation of an optical spot from the track center), a tangential tilt (tilt in the recording track tangential direction), and a radial tilt (tilt in the disc radial direction). An apparatus in which an increase of error rate caused by them is small is desired.

The case where spherical aberration is conducted in a recording-reproducing apparatus which conducts recording on an optical disc (hereafter referred to as optical disc A) formed of a plurality of layers, for example, including at least one unrecorded or additionally recordable recording layer (hereafter referred to as unrecorded layer J) and including at least one recording layer having an already recorded part even partially or a reproduction dedicated layer (hereafter referred to as already recorded layer X) will now be studied.

According to the technique described in JP-A-2002-157750, spherical aberration cannot be corrected in the unrecorded layer J.

In the apparatus described in JP-A-2006-139841, the work of respectively evaluating push-pull amplitudes from respective recording layers and detecting a correction quantity as in the optical disc recording-reproducing apparatus requires a time which is long in proportion to the number of stacked layers with the advance of multilayered recording layers. Since it is desired to shorten setup time required since disc insertion until recording or reproducing becomes possible, it becomes a problem to correct the spherical aberration more efficiently.

According to the technique described in JP-A-2007-164927, it becomes possible to shorten the correction time. However, an actuator coil which displaces the object lens in the optical disc recording-reproducing apparatus vibrates with a frequency in the vicinity of a specific resonance frequency the actuator coil has. Therefore, the position of the object lens at the time of continuous displacement does not increase simply linearly with the displacement time and an error corresponding to resonance is contained. As a result, dispersion is caused in the correction precision.

Considering tilt adjustment for an optical disc (hereafter referred to as optical disc B) formed of a plurality of layers including at least one additionally recordable recording layer (hereafter referred to as unrecorded layer K) having an already recorded place even partially and including at least one reproduction dedicated layer or recording layer already recorded on the whole surface (hereafter referred to as already recorded layer Y), there is the following problem.

For example, according to the technique described in JP-A-2003-346369, a tilt correction value is obtained in an unrecorded disc from which a reproduced signal is not obtained. However, the tilt correction value obtained in this scheme is not a value conforming to the reproduced signal. From the viewpoint of correction precision, therefore, there is a possibility the quality of the reproduced signal will be aggravated. For improving the reproduction quality, therefore, a tilt correction value obtained on the basis of the reproduced signal is desired in the unrecorded layer as well.

An object of the present invention is to provide an optical disc apparatus capable of shortening processing time of spherical aberration correction with respect to an unrecorded recording layer in a recording-reproducing apparatus which conducts recording on an optical disc formed of a plurality of layers including at least one unrecorded or additionally recordable recording layer and including at least one recording layer having an already recorded place even partially or reproduction dedicated layer.

Another object of the present invention is to provide an optical disc apparatus capable of conducting tilt adjustment to improve the reproduction quality in an additionally recordable recording layer when conducting recording on an optical disc formed of a plurality of layers including at least one additionally recordable recording layer having an already recorded place even partially and including at least one reproduction dedicated layer or recording layer already recorded on the whole surface.

The objects are attained by invention prescribed in claims. The objects are also attained by using means described hereafter.

An example of a feature of the present invention will now be described. An optical disc apparatus includes an optical pickup having a focus actuator to form an optical spot in a target layer in the optical disc A formed of a plurality of recording layers and drive the optical spot according to the sensed light quantity, and means for sensing reflected light of the optical spot, calculating a reproduced information signal, and generating a spherical aberration signal according to the reproduced information signal. The optical disc apparatus calculates a spherical aberration correction quantity in an unrecorded layer J, which is a correction target, as a first spherical aberration correction quantity on the basis of a spherical aberration correction quantity in an already recorded layer X and interlayer distances determined by standards, records information in a trial write region by using the first spherical aberration correction quantity, reproduces the information recorded in the trial write region, and finds a second spherical aberration correction quantity according to the reproduced information signal.

Preferably, the optical disc apparatus includes object lens position detection means for detecting the position of an object lens in the optical axis direction of laser light. When calculating the first spherical aberration correction quantity of each unrecorded layer on the basis of a spherical aberration correction quantity of the already recorded layer X, the optical disc calculates a distance to each unrecorded layer by using a predetermined calculation method on the basis of an interlayer distance determined by standards, and calculates the spherical aberration correction quantity on the basis of a result of the distance calculation.

Another example of a feature of the present invention concerns the optical disc B formed of a plurality of recording layers. Based on tilt correction values according to reproduction performance indexes such as amplitude of the reproduced information signal or error rate in positions of an inner circumference, middle circumference and outer circumference with respect to an axis in the radial direction in an already recorded layer Y, and a tilt correction value generated according to a reproduced information signal obtained in an already recorded region in each of unrecorded layers K which are correction targets, a tilt correction value in a region other than the data recorded region in the radial direction of each of the recording layers which are correction targets is calculated.

Another example of a feature of the present invention will now be described. As for the order of spherical aberration correction and tilt adjustment in the case where the optical disc apparatus conducts both the spherical aberration correction and the tilt adjustment in an adjustment sequence at the time of disc insertion, the spherical aberration correction is conducted earlier and then the tilt adjustment is conducted.

According to the present invention, it becomes possible to provide an optical disc apparatus capable of shortening processing time of spherical aberration correction with respect to an unrecorded recording layer in a recording-reproducing apparatus which conducts recording on an optical disc formed of a plurality of layers including at least one unrecorded or additionally recordable recording layer and including at least one recording layer having an already recorded place even partially or reproduction dedicated layer.

According to the present invention, it becomes possible to provide an optical disc apparatus capable of conducting tilt adjustment to improve the reproduction quality in an additionally recordable recording layer when conducting recording on an optical disc formed of a plurality of layers including at least one additionally recordable recording layer having an already recorded place even partially and including at least one reproduction dedicated layer or recording layer already recorded on the whole surface.

Other objects, features and advantages of the invention will become apparent from the following description of the embodiments of the invention taken in conjunction with the accompanying drawings.

BRIEF DESCRIPTION OF THE DRAWINGS

FIG. 10 is a table obtained by putting together definitions of an optical disc 100 in embodiments ranging from a first embodiment to a fourth embodiment.

DESCRIPTION OF THE EMBODIMENTS

Hereafter, embodiments of the present invention will be described with reference to the drawings.

First Embodiment

Figure 1:
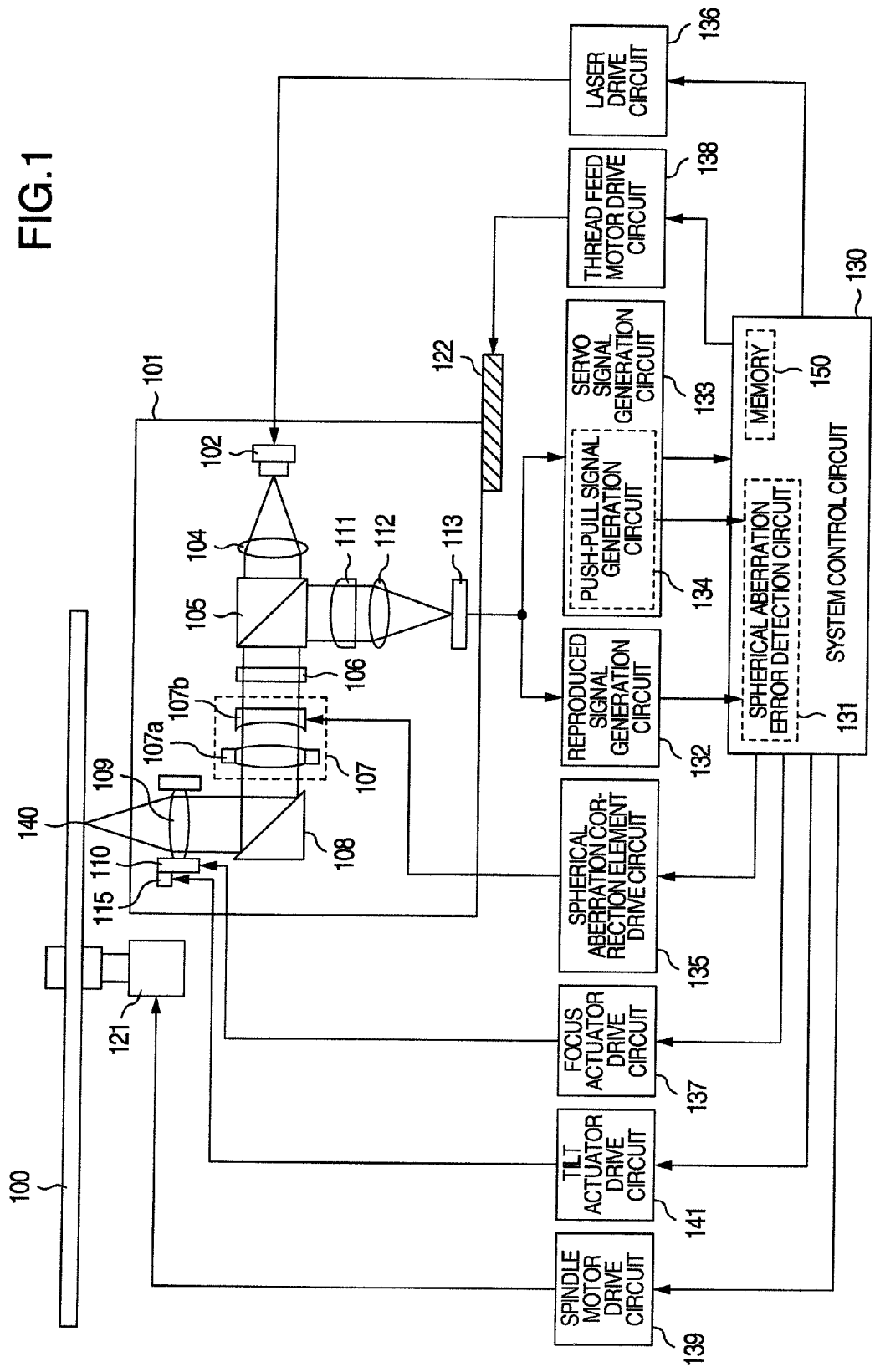
FIG. 1 is a block diagram showing a schematic configuration of an optical disc recording-reproducing apparatus.

FIG. 1 is a general block diagram of an optical disc recording-reproducing apparatus which records or reproduces information on an optical disc 100 in the embodiments.

In the optical disc 100, its incidence side surface of laser light is covered by a transparent protection layer (hereafter referred to as cover layer), and a transparent protection layer (hereafter referred to as intermediate layer) is provided between recording layers as well. Thermal deformation and oxidation are prevented from being caused by irradiating each recording layer with laser light. As an example of the optical disc 100, there is a multilayer Blue-ray disc. As another example of the optical disc 100, there is a hybrid type optical disc.

In the ensuing description, an unrecorded or additionally recordable recording layer is referred to as unrecorded recording layer J. In the ensuing description, a recording layer having an already recorded place even partially or a reproduction dedicated layer is referred to as already recorded layer X. In the ensuing description, an additionally recordable recording layer having an already recorded place even partially is referred to as unrecorded layer K. In the ensuing description, a reproduction dedicated layer or a recording layer already recorded on the whole surface is referred to as already recorded layer Y.

In the optical disc recording-reproducing apparatus, reference numeral 101 denotes an optical pickup, 102 a laser light source, 104 a collimate lens, 105 a polarization beam splitter, 106 a quarter-wave plate, and 107 a spherical aberration correction element group. In the spherical aberration correction element group 107, reference character 107a denotes a convex lens and 107b denotes a concave lens. Reference numeral 108 denotes a total reflection mirror, 109 an object lens, 110 an object lens focus actuator, 111a cylindrical lens, 112 a detection lens, 113 a photosensitive detector, 115 an object lens tilt actuator, 121 a spindle motor, 122 a thread motor, 130 a system control circuit, 131 a spherical aberration error detection circuit, 132 a reproduced signal generation circuit, 133 a servo signal generation circuit, 134 a push-pull signal generation circuit, 135 a spherical aberration correction element drive circuit, 136 a laser drive circuit, 137 a focus actuator drive circuit, 138 a thread feed motor drive circuit, 139 a spindle motor drive circuit, 140 an optical spot, 141 a tilt actuator drive circuit, and 150 a memory incorporated in the system control circuit.

In FIG. 1, the optical pickup 101 includes the laser light source 102, which emits a luminous flux of laser light having a wavelength λ corresponding to the optical disc 100, in order to conduct reproduction or recording and reproduction of an information signal on the attached optical disc 100. The optical pickup 101 further includes the collimate lens 104, which converts a luminous flux emitted from the laser light source 102 to a parallel luminous flux. The optical pickup 101 further includes the polarization beam splitter 105, which transmits predetermined linearly polarized light approximately 100% and reflects linearly polarized light perpendicular to the linearly polarized light approximately 100%. The optical pickup 101 further includes the quarter-wave plate 106, which converts linearly polarized light to circularly polarized light and converts circularly polarized light to linearly polarized light. The optical pickup 101 further includes the total reflection mirror 108 and the object lens 109 for forming the optical spot 140 on a predetermined recoding layer from a luminous flux supplied from the total reflection mirror 108 with a predetermined NA and aligned aberration. The optical pickup 101 further includes the object lens actuator 110 for displacing the object lens 109 in the focusing direction and the tracking direction, and the spherical aberration correction element 107 for correcting spherical aberration of the luminous flux incident on the object lens 109 and correcting spherical aberration of the optical spot 140 on the optical disc 100 caused by a substrate thickness error of the optical disc 100 and the like.

The luminous flux of the linearly polarized light emitted from the laser light source 102 is converted to a parallel luminous flux by the collimate lens 104. The polarization beam splitter 105 has a function of transmitting predetermined linearly polarized light approximately 100% and reflecting linearly polarized light perpendicular to the predetermined linearly polarized light approximately 100%. In this embodiment, the polarization beam splitter 105 is configured to transmit the luminous flux of the linearly polarized light emitted from the laser light source 102 approximately 100% and reflect a part. The luminous flux transmitted by the polarization beam splitter 105 is then converted to circularly polarized light by the quarter-wave plate 106. Then, the luminous flux is provided with predetermined spherical aberration by the spherical aberration correction element 107, then reflected by the total reflection mirror 108, and led to the object lens 109. The object lens 109 forms the optical spot 140 in a recording layer of the optical disc 100 in association with the incident luminous flux.

The reflected luminous flux from the optical disc 100 is passed through the object lens 109, the total reflection mirror 108, and the spherical aberration correction element 107 again, and converted to linearly polarized light perpendicular to the linearly polarized light emitted from the laser light source 102, by the quarter-wave plate 106. Therefore, the reflected luminous flux is reflected by the polarization beam splitter 105 approximately 100% and passed through the cylindrical lens 111. Thereafter, the reflected luminous flux is converted to a predetermined converging luminous flux by the detection lens 112 and led to the photosensitive detector 113.

The spherical aberration correction element 107 includes a combination of two lens sheets, i.e., the convex lens 107a and the concave lens 107b, which is variable in distance between lenses. The spherical aberration correction element 107 includes a beam expander which can correct spherical aberration of the transmitted luminous flux by changing the distance between the lenses in the combinational lens. Specifically, spherical aberration which is opposite in sign to spherical aberration caused by the cover layer and the intermediate layer of the optical disc 100 on the incident laser light is caused and led to the quarter-wave plate 106. The convex lens 107a in the spherical aberration correction element group 107 is provided in a state in which the convex lens 107a can be displaced in the optical axis direction of laser light with respect to the concave lens 107b. The spherical aberration can be corrected by using the position of the convex lens 107a relative to the concave lens 107b. The displacement of the convex lens 107a in the optical axis direction of laser light is conducted by the spherical aberration correction element drive circuit 135. However, the spherical aberration correction element is not restricted to this, but, for example, a liquid crystal element which has a concentric pattern and which can correct the spherical aberration by providing a phase difference between an inner part and a peripheral part of a luminous flux.

The optical pickup 101 includes the photosensitive detector 113. The photosensitive detector 113 receives reflected light from the optical disc 100 and converts it to an electric signal depending upon an intensity change of the reflected luminous flux obtained from the optical disc 100. The electric signal which is output from the photosensitive detector 113 is supplied to the reproduced signal generation circuit 132 and the servo signal generation circuit 133. In the reproduced signal generation circuit 132, a reproduced information signal recorded on the optical disc 100 is obtained on the basis of the electric signal. In the servo signal generation circuit 133, various servo signals such as a focus error signal and a tracking error signal are detected on the basis of the electric signal. In particular, the tracking error signal can be detected by the push-pull signal generation circuit 134 in the servo signal generation circuit 133 with a push-pull method.

As the photosensitive detector 113, therefore, for example, a quadrant photosensitive detector including four light sensing regions obtained by dividing a light sensing plane with two division lines which are parallel to a tangential direction and a radial direction of the optical disc 100 is used. Typically, output signals depending upon light sensing quantities in two light sensing regions on one side as regards the division line in the tangential direction and output signals depending upon light sensing quantities in two light sensing regions on the other side are obtained from the photosensitive detector 113. A focus error signal can be detected by using the quadrant photosensitive detector and using the cylindrical lens 111 provided between the polarization beam splitter 105 and the photosensitive detector 113 according to the astigmatism method.

The system control circuit 130 has a function of controlling the whole optical disc recording-reproducing apparatus. In other words, the system control circuit 130 exercises rotation control of the optical disc 100 attached to the spindle motor 121, via the spindle motor drive circuit 139. The system control circuit 130 drives the optical pickup 101 in the radial direction of the optical disc 100 via the thread feed motor drive circuit 138, and exercises access control and feed control. The system control circuit 130 exercises focus control and tracking control by driving the object lens focus actuator 110 via the focus actuator drive circuit 137. In addition, the system control circuit 130 detects and corrects spherical aberration of the optical pickup 101 via the spherical aberration correction element drive circuit 135. The detection principle of the spherical aberration and its correction procedure will be described later. The system control circuit functions as an acquisition part for acquiring a spherical aberration correction quantity and a tilt correction quantity.

The system control circuit 130 drives the laser light source 102 via the laser drive circuit 136 to cause a quantity of light emitted from the laser light source 102 to become a predetermined light quantity. As a result, the system control circuit 130 drives the laser light source 102 on the basis of a recording information signal at the time of recording. The laser light source 102 emits a laser luminous flux with an optical intensity and a pulse width (strategy) corresponding to the recording information signal.

The reflected luminous flux from the optical disc 100 is sensed by the photosensitive detector 113 and converted to an electric signal, and the electric signal is sent to the reproduced signal generation circuit 132 and the servo signal generation circuit 133. The servo signal generation circuit 133 selects and generates various servo signals by using a detection method which is optimum according to the attached optical disc 100, and supplies the various servo signals to the system control circuit 130. The system control circuit 130 drives the object lens focus actuator 110 via the focus actuator drive circuit 137 on the basis of the supplied servo signals and operates focus servo and tracking servo.

Figure 2:
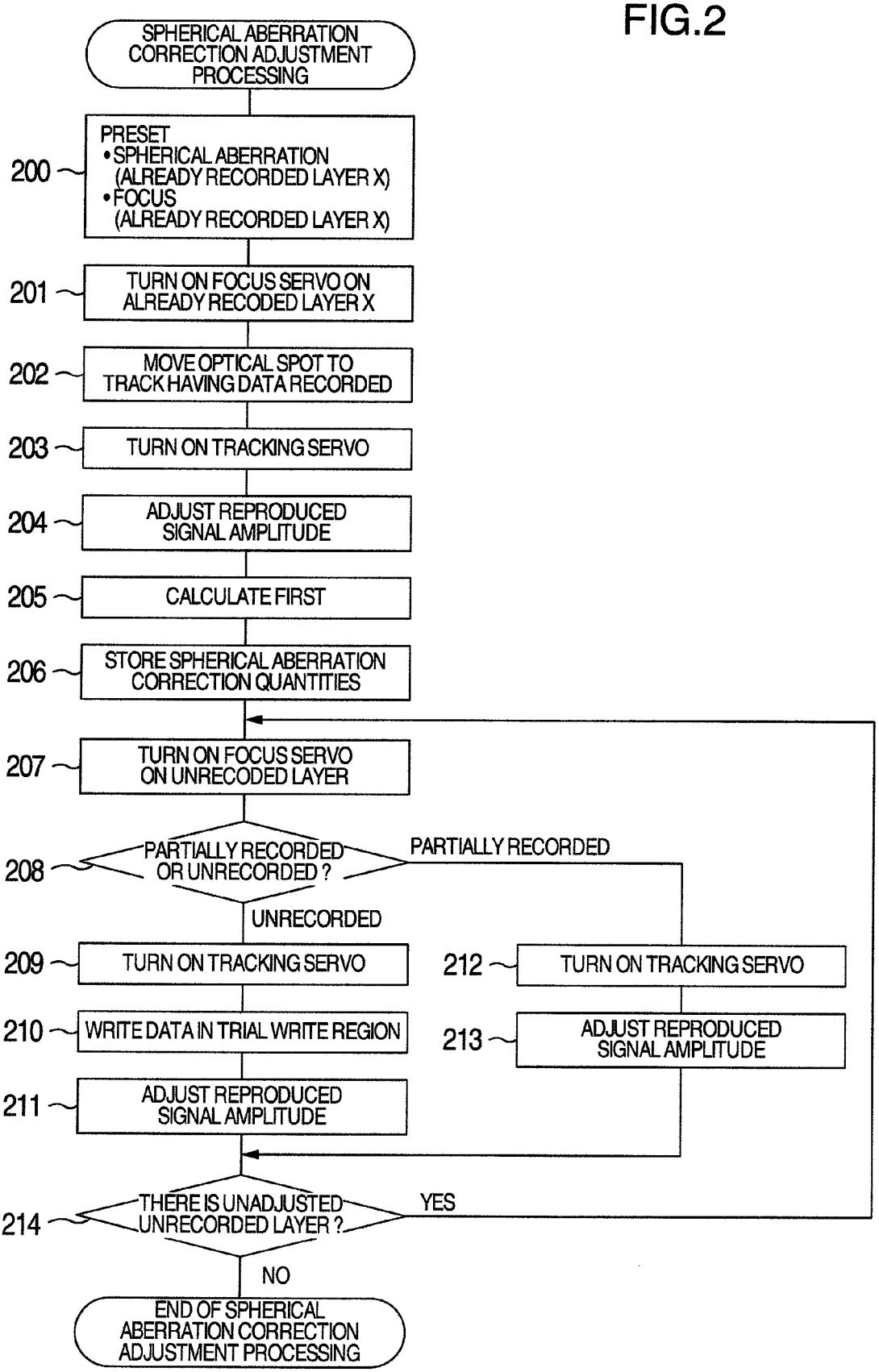
FIG. 2 is a flow chart showing an example of an adjustment processing algorithm for spherical aberration correction in the optical disc recording-reproducing apparatus shown in FIG. 1.

A basic procedure of a spherical aberration correction step executed by the system control circuit 130 will now be described with reference to a flow chart shown in FIG. 2.

It is now supposed that the optical disc 100 used in the ensuing description is an optical disc A formed of a plurality of layers including at least one unrecorded layer J and including at least one already recorded layer X.

Upon start of processing, the optical disc apparatus first sets a target point of the focus servo to a preset value. The optical disc apparatus drives the spherical aberration correction element group 107 and sets the spherical aberration correction quantity to a preset value, according to the recording layer of the attached optical disc A. For example, if recording layers in the optical disc A includes three layers, i.e., an L0 layer, an L1 layer and an L2 layer, then the optical disc apparatus sets the spherical aberration correction element group 107 to a different position according to which of the L0 layer, the L1 layer and the L2 layer is the already recorded layer X. In the ensuing description, it is supposed that recording is conducted on the optical disc A formed of a total of three layers in which the L0 layer is the already recorded layer X and both the L1 layer and the L2 layer are the unrecorded layers J, for brevity. It is supposed that the target point of the tracking servo, laser recording power and the recording strategy are also set to preset values for simplicity of the description.

When setting the preset values, it is necessary to judge the attached optical disc to be the optical disc A. Furthermore, when setting the preset values, it is necessary to acquire information indicating which layer is the already recorded layer X. As for them, for example, focus control may be exercised in the optical disc apparatus and discrimination may be conducted on the basis of amplitude of the focus error signal. Discrimination may be conducted on the basis of management information such as, for example, BCA (Burst Cutting Area) or DI (Disc Information) reproduced by the optical disc apparatus. Furthermore, the apparatus may be configured to make it possible for the user to input information indicating the kind of an optical disc via a host apparatus, for example, at the time of loading processing of the optical disc.

If the initial value presetting is completed, then the optical disc apparatus first brings about a state in which the focus servo is applied to form an optical spot on a recording surface of the already recorded layer X at step 201. In the already recorded layer X, data is already recorded. At step 202, therefore, the optical disc apparatus moves the optical spot to a track region having data recorded therein. Then, the optical disc apparatus brings about a state in which the tracking servo is applied at step 203. Then, the optical disc apparatus proceeds to step 204 of correction using amplitude of the reproduced signal which will be described later.

At the step 204, the optical disc apparatus conducts correction by using amplitude information of the reproduced signal (hereafter referred to as reproduced signal amplitude correction), and finishes adjustment learning of spherical aberration correction in the already recorded layer X. As a result of the spherical aberration correction conducted at the step 204, a spherical aberration correction result of the already recorded layer X is stored in the memory 150 as a second spherical aberration correction quantity SAB0 of the L0 layer.

At step 205, the optical disc apparatus calculates first spherical aberration correction quantities SAA1 and SAA2 respectively in the recording layers L1 and L2 by using a predetermined calculation method on the basis of the spherical aberration correction result SAB0 of the already recorded layer X stored in the memory 150 and an interlayer distance D1 between the recording layers L0 and L1 and an interlayer distance D2 between the recording layers L0 and L2 which are calculated from layer intervals determined by specifications. Then, at step 206, both the calculation results SAA1 and SAA2 are stored in the memory 150.

Then, at step 207, the optical disc apparatus brings about a state in which the focus servo is applied to form an optical spot on a surface of the unrecorded layer J. By the way, the first spherical aberration correction quantities calculated at the step 205 are used as spherical aberration correction quantities at the time of focusing in the unrecorded layer J.

At step 208, the optical disc apparatus judges which of an unrecorded layer and an already recorded layer even partially the unrecorded layer J subjected to focus servo at the step 207 is.

If the unrecorded layer J is judged to be an unrecorded layer at the step 208, then the processing proceeds to step 209 and the optical disc apparatus brings about a state in which the tracking servo is applied to a trial write region. Then the optical disc apparatus writes data at step 210, and conducts spherical aberration correction by using amplitude of a predetermined reproduced signal to obtain the second spherical aberration correction quantity SAB at step 211. Both correction results SAB1 and SAB2 in the present example are stored in the memory 150.

If the unrecorded layer J is judged to be a partially recorded layer at the step 208, then the processing proceeds to step 212 and the optical disc apparatus brings about a state in which the tracking servo is applied to the already recorded region. Then, the optical disc apparatus conducts spherical aberration correction by using amplitude of a predetermined reproduced signal to obtain the second spherical aberration correction quantity SAB at step 213. In the same way as the step 211, both correction results SAB1 and SAB2 are stored in the memory 150.

Then, at step 214, the optical disc apparatus judges whether there is an uncorrected recording layer besides the recording layer corrected immediately before.

If an uncorrected recording layer is judged at the step 214 to be present, then it is necessary to conduct spherical aberration correction on the remaining recording layer as well. In this case, therefore, the processing proceeds to the step 207, and the optical disc apparatus conducts the series of spherical aberration corrections ranging from the step 209 to the step 211 or ranging from the step 212 to the step 213. The correction processing is conducted by the step 214 until the spherical aberration correction on all recording layers is completed.

On the other hand, if the adjustment learning of the spherical aberration correction is judged at the step 214 to have been conducted on all recording layers, then the adjustment processing of the spherical aberration correction is finished.

As for the tracking servo at the step 203, the tracking servo need not necessarily be turned on if the already recorded layer X is especially a reproduction dedicated layer or a recording layer already recorded on the whole surface.

The reproduced signal amplitude correction at the step 204, the step 211 and the step 213 is not restricted to the reproduced signal amplitude, but it may be changed to an index, such as jitter or an error rate, for evaluating the reproduction performance.

Hereafter, details of the calculation of the first spherical aberration correction quantity for each unrecorded layer J based on the spherical aberration correction result in the already recorded layer X, which is conducted at the step 205 in the flow chart shown in FIG. 2, will be described.

The system control circuit 130 includes a CPU, a ROM and a RAM, and has a function of controlling the whole optical disc recording-reproducing apparatus. It is possible to test the optical disc A by executing an optical disc test program and display the execution process and execution result of the test on an output recording-reproducing apparatus formed of an external display, a printer or the like as the occasion demands. In this case, the system control circuit 130 executes a spherical aberration correction quantity calculation program at the step 205 in FIG. 2 prior to test of the optical disc A. And the system control circuit 130 calculates the spherical aberration correction quantities respectively of recording layers in the optical disc A by executing the spherical aberration correction quantity calculation program, and stores them in the internal memory 150.

Figure 3:
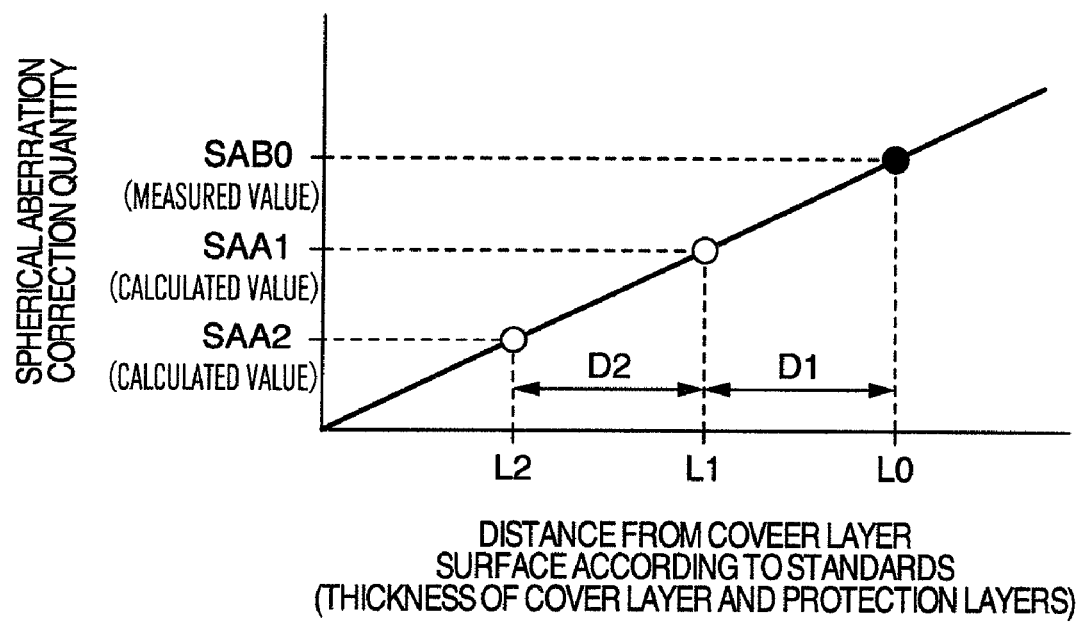
FIG. 3 is a relation diagram showing a relation between a spherical aberration correction quantity and a distance from the surface of a cover layer.

The spherical aberration correction quantity is a correction quantity of spherical aberration depending upon each of distances between a surface of the cover layer and recording layers in the optical disc A, i.e., a position (distance) of the convex lens 107a relative to the concave lens 107b. The spherical aberration correction quantity is calculated on the basis of a function for correction quantity calculation, which is defined in the spherical aberration correction quantity calculation program designed in the system control circuit 130. The spherical aberration correction quantity is calculated so as to increase linearly as the distance from the surface of the cover layer in the optical disc A increases as shown in FIG. 3. Here, the distance corresponds to a thickness of the protection layers including the cover layer and the intermediate layers through which laser light is transmitted. By the way, a table which previously stores the spherical aberration correction quantity corresponding to the position of the convex lens 107a relative to the concave lens 107b may be used instead of the function for calculation.

At the step 205, the system control circuit 130 operates as described above to calculate the first spherical aberration correction quantities SAA1 and SAA2. Specifically, the system control circuit 130 calculates SAA1 and SAA2 by using interlayer distances D1 and D2 between the recording layers L0, L1 and L2 as arguments. At this time, the interlayer distances used as the arguments are calculated by referring to an interlayer distance table prepared beforehand in the system control circuit 130 on the basis of a disc kind recorded in a disc management region. Then, the system control circuit 130 stores SAA1 and SAA2 calculated as described above in the memory 150 respectively in association with the recording layers L1 and L2 at the step 206.

Although omitted in the present embodiment, focus offset adjustment is also conducted in typical correction together with the spherical aberration correction.

According to the multilayer optical disc recording method described in the present embodiment, it becomes possible to shorten the time required for the spherical aberration correction in the optical disc A formed of a plurality of layers including at least one unrecorded layer J and at least one already recorded layer X. In addition, since values for other layers are calculated on the basis of an accurate correction value on at least one surface and layer intervals determined by standards, spherical aberration correction with high precision becomes possible.

Second Embodiment

An optimum tilt adjustment method will now be described with reference to a flow chart shown in FIG. 4.

It is supposed that the optical disc 100 is the optical disc B formed of a plurality of layers including at least one unrecorded layer K and at least one already recorded layer Y.

In the ensuing description, it is supposed that recording is conducted on an optical disc formed of a total of three layers in which only the L0 layer is the already recorded layer Y and both the L1 layer and the L2 layer are the unrecorded layers K, for brevity. It is supposed that already recorded places in L1 and L2 are a trial write region located on an inner circumference side in the radial direction.

Upon starting processing, a drive value of the focus servo is set to a preset value at step 400.

Then at step 401, the optical disc apparatus brings about a state in which the focus servo is applied to form an optical spot on a recording surface of the already recorded layer Y which is the target.

When setting the preset values, it is necessary to judge the attached optical disc to be the optical disc B. Furthermore, when setting the preset values, it is necessary to acquire information indicating which layer is the already recorded layer Y. As for them, for example, focus control may be exercised in the optical disc apparatus and discrimination may be conducted on the basis of amplitude of the focus error signal. Discrimination may be conducted on the basis of management information such as, for example, BCA (Burst Cutting Area) or DI (Disc Information) reproduced by the optical disc apparatus. Furthermore, the apparatus may be configured to make it possible for the user to input information indicating the kind of an optical disc via a host apparatus, for example, at the time of loading processing of the optical disc.

In addition, the optical disc apparatus moves the optical spot to the inner circumference side of a data region in the already recorded layer Y at step 402. Then, the optical disc apparatus brings about a state in which the tracking servo is applied at step 403. In addition, at step 404, the optical disc apparatus conducts tilt adjustment using amplitude of a predetermined reproduced signal and records an inner circumference tilt adjustment result IN of the already recorded layer Y in the memory 150 as IN0.

At step 405, the optical disc apparatus moves the optical spot to a middle circumference side of the data region in the already recorded layer Y subjected to the tilt adjustment in the inner circumference. Then, at step 406, the optical disc apparatus brings a state in which the tracking servo is applied. At step 407, the optical disc apparatus conducts tilt adjustment using the amplitude of the reproduced signal in the same way as that at the time of the inner circumference. A result of the tilt adjustment is recorded in the memory 150 as MD. In the example at this time, a value of MD0 is recorded. At step 408, the optical disc apparatus moves the optical spot to the outer circumference side of the data region in the already recorded layer subjected to the tilt adjustment in the inner circumference and the middle circumference. Then, at step 409, the optical disc apparatus brings about a state in which the tracking servo is applied. At step 410, the optical disc apparatus conducts the tilt adjustment using the reproduced signal amplitude in the same way as that at the time of the inner circumference and the middle circumference. A result of this tilt adjustment is recorded in the memory 150 as OT. In the example at this time, OT0 is recorded.

Then, at step 411, the optical disc apparatus regards the unrecorded layer K which is not adjusted yet as a target layer and sets a drive value of the focus servo to a preset value. In the example at this time, the optical disc apparatus conducts the setting for L1 and L2 in both of which a region on the inner circumference side is already recorded. Then, at step 412, the optical disc apparatus brings about a state in which the focus servo is applied to form an optical spot on a target surface. In addition, at step 413, the optical disc apparatus moves the optical spot to a region having data recorded therein on the disc, by using the thread motor 122. In the example at this time, the optical disc apparatus moves the optical spot to the inner circumference side having the trial write region. Then, at step 414, the optical disc apparatus brings about a state in which the tracking servo is applied. At step 415, tilt adjustment is conducted according to a tilt adjustment method using the amplitude of the reproduced signal. As a result, an inner circumference tilt adjustment result IN of the unrecorded layer is obtained. In the example at this time, IN1 and IN2 are obtained respectively for L1 and L2. IN which is the result of the correction is stored in the memory 150. At step 416, the optical disc apparatus calculates a correction result in a position other than the data recorded region with respect to the radial direction corrected at the step 415, by using a predetermined calculation method. In the example at this time, the optical disc apparatus calculates the correction results MD/OT of the middle circumference/outer circumference from the tilt correction value IN of the inner circumference.

If the step 416 is finished, then it is judged at step 417 whether there is an unrecorded layer K for which the tilt adjustment is not yet corrected.

If it is judged at the step 417 that there is unrecorded layer K which is not yet corrected, then it is necessary to conduct tilt adjustment learning on remaining recording layers as well. In this case, therefore, the processing proceeds to the step 411 and the series of tilt adjustment learning ranging from the step 411 to the step 416 is conducted. The adjustment learning is conducted by the step 417 until the tilt adjustment on all recording layers is completed.

On the other hand, if the tilt adjustment is judged at the step 417 to have been conducted on all recording layers, then the optical disc apparatus finishes the initial adjustment of the tilt adjustment.

Hereafter, the reason why the tilt adjustment is conducted at a plurality of points in the radial direction on the same recording surface will be described in detail with reference to FIG. 5.

Figure 5:
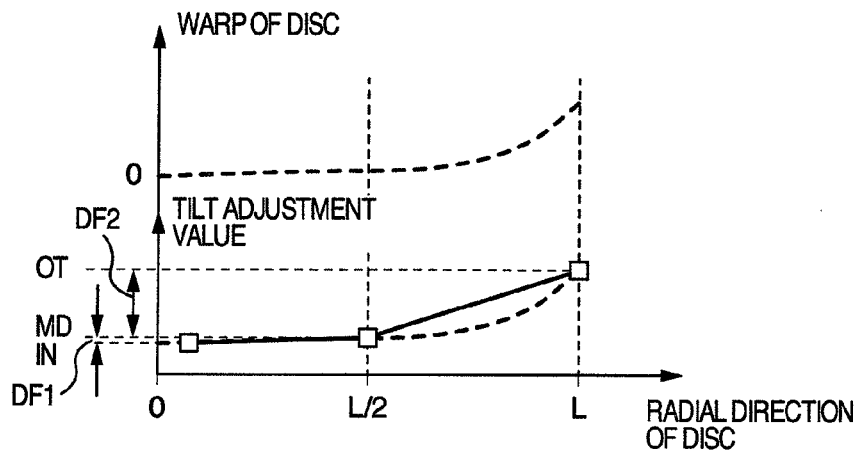
FIG. 5 is a diagram for explaining a disc warp and a tilt correction value according to a seek position in an embodiment in the optical disc recording-reproducing apparatus shown in FIG. 1.

FIG. 5 shows warp of the disc in its radial direction in its upper part and shows the tilt adjustment value corresponding to the warp in its lower part. L denotes a radial distance of the optical disc. As shown in the upper part of FIG. 5, the warp of the optical disc typically becomes greater as the point advances in the radial direction of the optical disc. In the present invention, the tilt adjustment is conducted at several points in the radial direction of the disc and tilt correction values between measurement points are interpolated by using a function. In the ensuing description, it is supposed for brevity that the tilt adjustment is conducted at a total of three points, i.e., one point in the inner circumference, one point in the middle interference, and one point in the outer circumference and linearly polarized values obtained by coupling measurement points with a straight line are used as tilt correction values between measurement points as shown in the lower part of FIG. 5.

The measurement points in the tilt adjustment are not restricted to three points, but the measurement may be conducted at two measurement points or four or more measurement points. In general, the warp of the disc abruptly increases at ends of the disc. For example, therefore, it also becomes possible to obtain tilt adjustment results with higher precision by increasing measurement points between L and L/2. As for the interpolation between measurement points, not only the linear interpolation but also curvilinear interpolation may be conducted.

In general, influence of the coma aberration becomes great as the substrate thickness of the disc increases. Denoting the substrate thickness of the disc by "T" and the numerical aperture of the object lens by "NA", the coma aberration CA is represented by the following expression.

$$CA \propto T \cdot NA^3 \quad \text{(Expression 1)}$$

It is appreciated from the expression that the coma aberration is in proportion to the cube of the NA of the object lens and the substrate thickness of the disc.

In the optical disc having a structure obtained by stacking two or more recording layers like the optical disc 100, coma aberration is caused because the disc substrate thickness changes from recording layer to recording layer. In the optical disc having such a multilayer structure, therefore, it becomes necessary to conduct coma aberration adjustment with due regard to the substrate thickness.

A method for calculating the tilt correction value in a recording layer which is not yet adjusted in tilt, by utilizing the tilt correction values in the inner circumference, the middle circumference, and the outer circumference of the already recorded layer Y at the step 416 will now be described in detail with reference to a flow chart shown in FIG. 6. Specifically, a method for calculating a tilt correction value in a radial position other than a data recorded region in an unrecorded layer K which is not yet adjusted in tilt will be described. In other words, a method for calculating the tilt correction value in data unrecorded region in the unrecorded layer K will be described.

It is supposed in the description that the recording layer which is unadjusted in tilt is L1. For brevity of the description, it is supposed that tilt correction values in the inner circumference, the middle circumference and the outer circumference of the already recorded layer Y are respectively IN0, MD0 and OT0 and a tilt correction value IN1 in the inner circumference of L1 is already stored in the memory 150.

Figure 6:
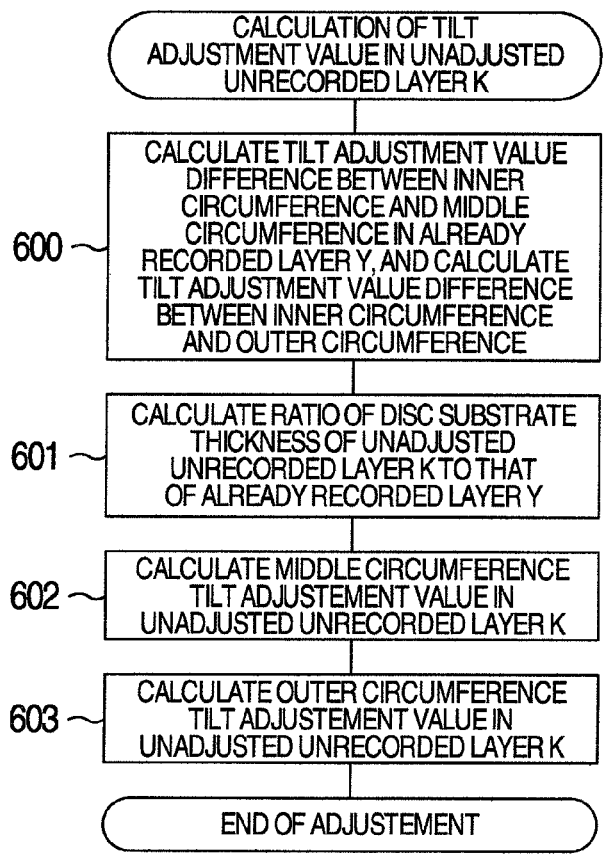
FIG. 6 is a flow chart of a tilt correction value calculation algorithm for a middle/outer circumference in an unrecorded layer shown in FIG. 5.

In FIG. 6, the optical disc apparatus first calculates DF1 and DF2 from tilt correction values IN0, MD0 and OT0 respectively in the inner circumference, the middle circumference and the outer circumference in the already recorded layer Y stored in the memory 150 at step 600. DF1 is a value indicating a difference between the tilt correction value in the middle circumference and the tilt correction value in the inner circumference, and DF2 is a value indicating a difference between the tilt correction value in the outer circumference and the tilt correction value in the inner circumference. And DF1 and DF2 are calculated by using the following expression.

$$DF1 = MD0 - IN0$$

$$DF2 = OT0 - IN0 \quad \text{(Expression 2)}$$

Then, at step 601, the optical disc apparatus calculates a ratio P of a disc substrate thickness of an unadjusted unrecorded layer K to that of the already recorded layer Y. The coma aberration is in proportion to the disc substrate thickness as described above. Supposing that the already recorded layer Y is L0 and the unrecorded layer K is L1, therefore, a ratio P1 of the disc substrate thickness of L1 to that of L0 is calculated by the following expression.

$$P1 = IN1/IN0 \quad \text{(Expression 3)}$$

After finding the ratio in disc substrate thickness at the step 601, the optical disc apparatus calculates a middle circumference tilt correction value MD in the unrecorded layer K at step 602. The middle circumference tilt correction value MD is calculated from the inner circumference tilt correction value IN in the unrecorded layer, the tilt correction value difference DF, and the disc substrate thickness ratio P. Supposing that the already recorded layer Y is L0 and the unrecorded layer K is L1, the middle circumference tilt correction value MD1 in L1 is calculated by the following expression.

$$MD1 = IN1 + P1 \times DF1 \quad \text{(Expression 4)}$$

Then, at step 603, the optical disc apparatus calculates an outer circumference tilt correction value OT in the unrecorded layer K. The outer circumference tilt correction value is calculated from the inner circumference tilt correction value IN in the unrecorded layer K, the tilt correction value difference DF, and the disc substrate thickness ratio P. Supposing that the already recorded layer Y is L0 and the unrecorded layer K is L1, the outer circumference tilt correction value OT1 in L1 is represented by the following expression.

$$OT1 = IN1 + P1 \times DF2 \quad \text{(Expression 5)}$$

Figure 4:
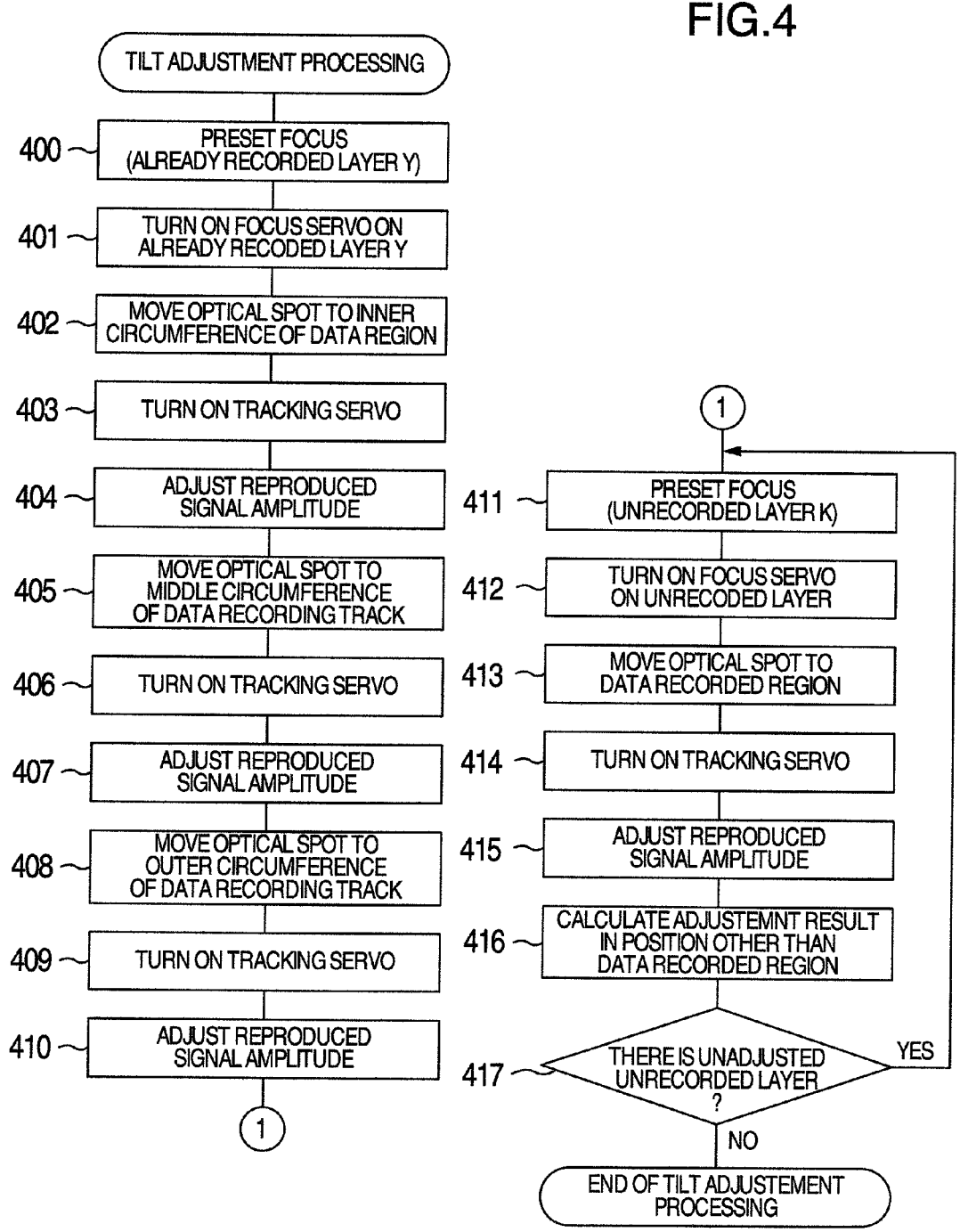
FIG. 4 is a flow chart showing an example of an adjustment processing algorithm for tilt adjustment in the optical disc recording-reproducing apparatus shown in FIG. 1.

The calculation of tilt correction values in the middle circumference and the outer circumference of the unrecorded layer K conducted by utilizing the tilt correction values in the inner circumference, the middle circumference and the outer circumference of the already recorded layer Y at the step 416 shown in FIG. 4 is finished by the steps 600 to 603 described heretofore and shown in the flow chart in FIG. 6.

As for the derivation of the tilt correction values in the unrecorded layer K, the adjustment results in the inner circumference, the middle circumference and the outer circumference of the already recorded layer Y as they are may be used as adjustment results in the inner circumference, the middle circumference and the outer circumference of the unrecorded layer K.

As for the calculation of the tilt correction value in the unrecorded layer K, the ratio of the disc substrate thickness may be calculated from the interlayer distances determined by standards without using the tilt correction result in the inner circumference of the unrecorded layer K, in the calculation of the disc substrate thickness ratio at the step 601.

According to the multilayer optical disc recording method described in the present embodiment, correction depending upon the reproduction performance index becomes possible in the tilt adjustment in an unrecorded layer for which only correction depending upon the amplitude of the push-pull signal or the wobble signal can be conducted until now, in the optical disc B formed of a plurality of layers including at least one unrecorded layer K and at least one already recorded layer Y. Furthermore, improvement of the reproduction quality can be anticipated as compared with the conventional tilt adjustment method.

Third Embodiment

In the present embodiment, the case where both the spherical aberration correction in the first embodiment and the tilt correction in the second embodiment are conducted in the adjustment sequence at the time of disc insertion will be described. The optical disc 100 in the present embodiment is an optical disc (hereafter referred to as optical disc C) formed of a plurality of layers including at least one unrecorded layer J and at least one already recorded layer Y.

As for the order of the spherical aberration correction and the tilt adjustment in the adjustment sequence at the time of BD insertion, it is supposed in the present embodiment that the spherical aberration correction is conducted earlier. Hereafter, the reason will be described.

In the present embodiment, it is desirable to use a value conformed to the reproduction performance as an index in the adjustment. The reason is that the improvement of the reproduction quality can be anticipated. As the index conformed to the reproduction, there is, for example, reproduced signal amplitude. For obtaining the reproduced signal amplitude, it is necessary to conduct recording in an additionally recordable recording layer.

Denoting the substrate thickness error of the disc by "$\Delta T$" and the numerical aperture of the object lens by "NA", the spherical aberration correction quantity SA is represented by the following expression.

$$SA \propto \Delta T \cdot (NA)^4 \quad \text{(Expression 6)}$$

It is appreciated from the expression that the spherical aberration is in proportion to the fourth power of the NA of the object lens and the substrate thickness error of the disc.

The BD is greater in numerical aperture than high density optical discs such as the HD-DVD or DVD. Since the substrate thickness of the disc is thin, the substrate thickness error $\Delta T$ brought about in the manufacture process is also great. Therefore, contribution of the spherical aberration correction quantity to the recording/reproduction precision in the BD is greater as compared with other optical discs.

For obtaining the reproduced signal amplitude in a tilt unadjusted layer in the BD, it is necessary that at least a part of the recording layer has data recorded therein. Furthermore, at that time, it is necessary that the spherical aberration correction has been finished at the time of recording for the reason of the recording precision. As for the order of the spherical aberration correction and the tilt adjustment in the adjustment sequence, therefore, it is supposed that the spherical aberration correction is conducted earlier.

The spherical aberration correction and the tilt adjustment in the adjustment sequence will now be described in detail with reference to FIG. 7.

Figure 7:
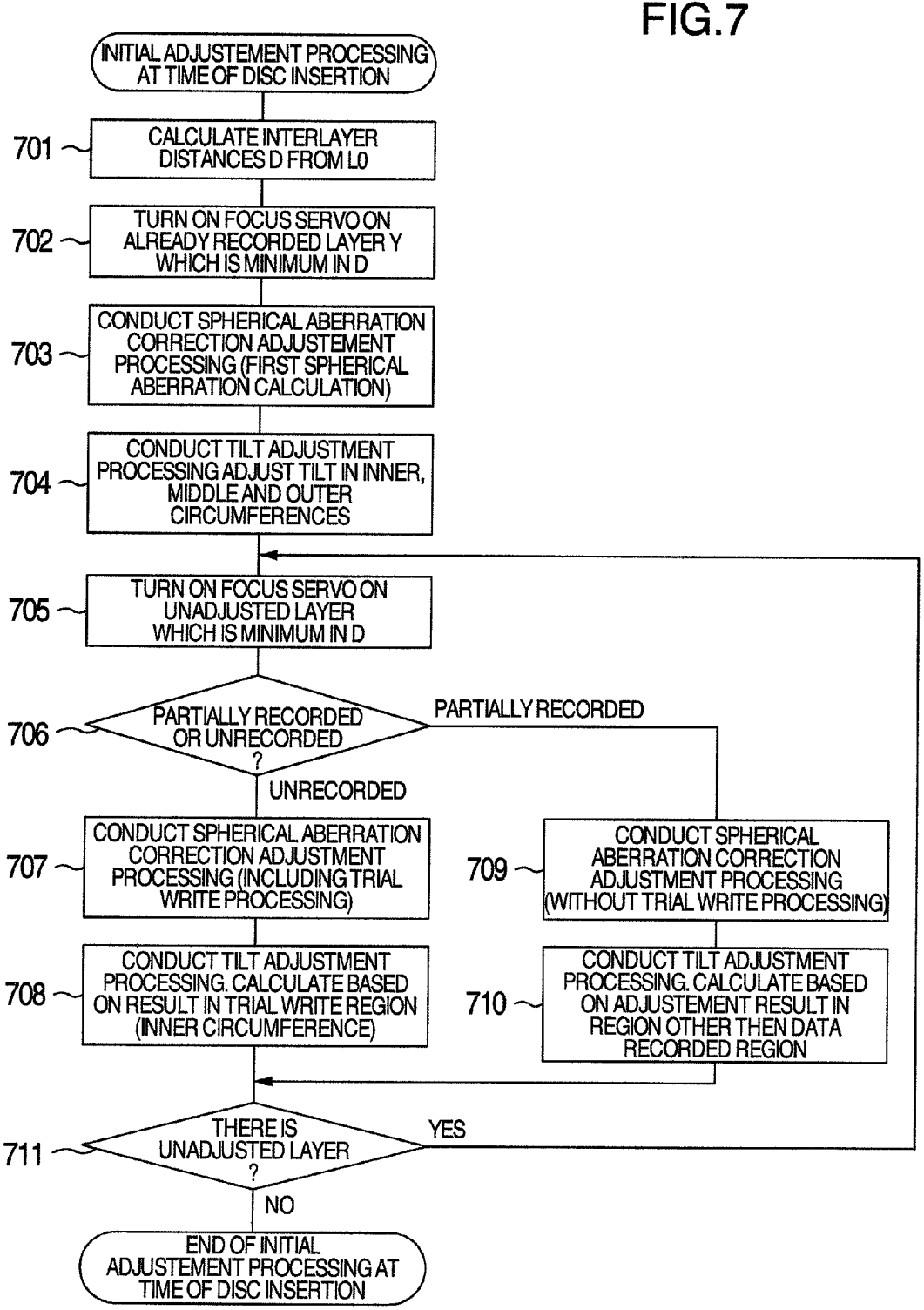
FIG. 7 is a flow chart for an initial adjustment processing algorithm at the time when a BD is inserted.

As shown in FIG. 7, the optical disc apparatus first calculates interlayer distances D of respective layers from L0 in the optical disc C on the basis of values determined by standards, at step 701. Then at step 702, the optical disc apparatus brings about a state in which the focus servo is applied to an already recorded layer Y which is minimum in the interlayer distance D calculated at the step 701.

Then, at step 703, the optical disc apparatus conducts spherical aberration correction processing on the already recorded layer Y subjected to the focus servo at the step 702. The spherical aberration correction processing at the step 703 is equivalent to the processing conducted at the steps 203 to 206 in the flow chart shown in FIG. 2.

At step 704, the optical disc apparatus conducts the tilt adjustment processing on the already recorded layer Y. The tilt adjustment processing at the step 704 is equivalent to the processing conducted at the steps 402 to 410.

Then, at step 705, the optical disc apparatus brings about a state in which the focus servo is applied to a layer which is other than the already recorded layer Y adjusted at the steps 701 to 704, which is unadjusted, and which is minimum in the interlayer distance D from L0. Then at step 706, the optical disc apparatus judges whether the layer subjected to the focus servo at the step 705 is a layer already recorded even partially.

If the layer subjected to the focus servo is judged to be a completely unrecorded layer at the step 706, then the processing proceeds to step 707. At the step 707, the optical disc apparatus conducts spherical aberration correction processing on the completely unrecorded layer. The spherical aberration correction processing at the step 707 is equivalent to the processing conducted at the steps 413 to 416 shown in FIG. 2.

Then, at step 708, the optical disc apparatus conducts tilt adjustment processing. The tilt adjustment at the step 708 is equivalent to the processing conducted at the steps 413 to 416 shown in FIG. 4.

On the other hand, if the layer subjected to the focus servo is judged at the step 706 to be a layer already recorded even partially, then the processing proceeds to step 709. At the step 709, the optical disc apparatus conducts spherical aberration correction processing on the layer already recorded even partially. The spherical aberration correction processing at the step 709 is equivalent to the processing conducted at the steps 212 and 213 shown in FIG. 2.

Then, at step 710, the optical apparatus conducts tilt adjustment processing on the layer already recorded even partially. The tilt adjustment at the step 710 is equivalent to the processing conducted at the steps 413 to 416 shown in FIG. 4.

If the adjustment layer is the already recorded layer Y at the step 710, then tilt adjustment based on the reproduced signal amplitude is conducted in the inner circumference and tilt adjustment results in the middle circumference and the outer circumference are calculated on the basis of a result of the tilt adjustment in the inner circumference.

If the step 708 or the step 710 is finished, then the processing proceeds to step 711. At the step 711, the optical disc apparatus judges whether there is a layer which is unadjusted in spherical aberration and tilt adjustment.

If it is judged at the step 711 that there is an unadjusted layer, the processing proceeds to the step 705 and adjustment is conducted on the unadjusted layer.

On the other hand, if it is judged at the step 711 that the initial adjustment sequence at the time of disc insertion has been conducted on all recording layers, then the optical disc apparatus finishes initial adjustment learning of tilt adjustment.

If the tilt adjustment processing is executed after the tilt adjustment processing in the initial adjustment sequence at the time BD disc insertion as heretofore described, then the amplitude of the reproduced signal can be used as an index.

In the embodiment shown in FIG. 7, the focus servo on the unadjusted layer in the adjustment sequence is conducted after adjustment processing of both the spherical aberration correction and the tilt adjustment in each layer has been finished. As for timing of the focus servo, the focus servo may be conducted each time processing of each of the spherical aberration correction processing and the tilt adjustment processing is finished in each layer. In this case, the focus servo must be applied to each layer whenever each adjustment is finished. Therefore, it is considered that the time required for the adjustment increases as compared with the adjustment sequence shown in FIG. 7.

In the embodiment, the adjustment sequence is conducted in the order of increasing interlayer distance from L0. However, the order of layers to be adjusted need not be the order of increasing interlayer distance from L0.

In the tilt adjustment of an already recorded layer Y other than the already recorded layer Y used in the calculation of the first spherical aberration correction quantity and tilt adjustment including the middle circumference and the outer circumference, adjustment values in the middle circumference and the outer circumference are found by calculation in the example described in the embodiment. However, this example is not restrictive. If the optical disc C is equivalent to the optical disc B, the optical disc apparatus may find the adjustment values by actually conducting tilt adjustment in already recorded regions in the middle circumference and the outer circumference.

The order of the initial adjustment processing at the time of disc insertion in the embodiment may be changed according to the kind of the inserted disc. For example, as for the order of the spherical aberration correction and the tilt adjustment in the initial adjustment sequence, the tilt adjustment is conducted earlier if the inserted disc is an HD-DVD. This is because the HD-DVD is greater in substrate thickness T than the BD and the influence of the coma aberration represented by Expression 1 is great.

According to the optical disc apparatus in the present embodiment, it thus becomes possible to improve the processing speed in the case where both the spherical aberration correction and the tilt correction are conducted.

Fourth Embodiment

If there are a plurality of reproduction dedicated layers or recording layers already recorded on the whole surface which can be used at the time of calculation of the first spherical aberration correction quantity and tilt adjustment including the middle circumference and the outer circumference, only one layer closest to L0 is used. Such an example of the adjustment sequence has been described in the third embodiment. In the present embodiment, the case where a plurality of reproduction dedicated layers or recording layers already recorded on the whole surface are used for calculation of the first spherical aberration correction quantity and tilt adjustment including the middle circumference and the outer circumference of the optical disc 100 in the adjustment sequence at the time of disc insertion will now be described.

Figure 8:
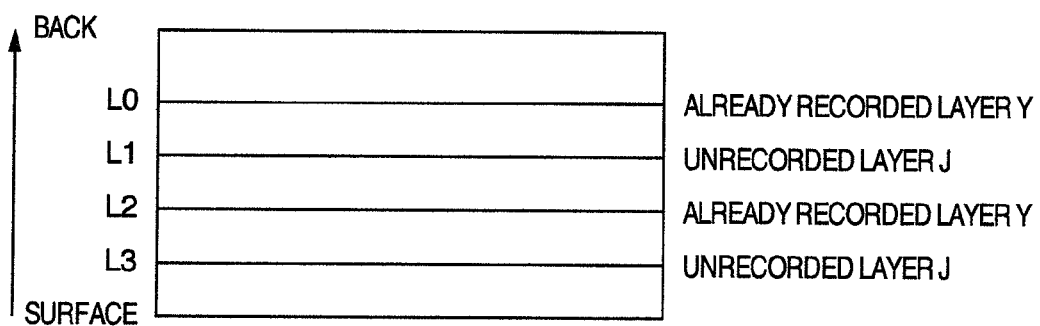
FIG. 8 is a diagram for explaining an example of an optical disc including a plurality of reproduction dedicated layers or recording layers already recoded on the whole surface which can be used for calculation of a first spherical aberration correction quantity and tilt adjustment including middle/outer circumferences.

The optical disc 100 in the present embodiment is an optical disc (hereafter referred to as optical disc D) formed of a plurality of layers including at least one unrecorded layer J and at least two already recorded layers Y like an optical disc shown in FIG. 8.

Hereafter, an adjustment sequence at the time of the optical disc D insertion will be described in detail with reference to FIG. 9.

Figure 9:
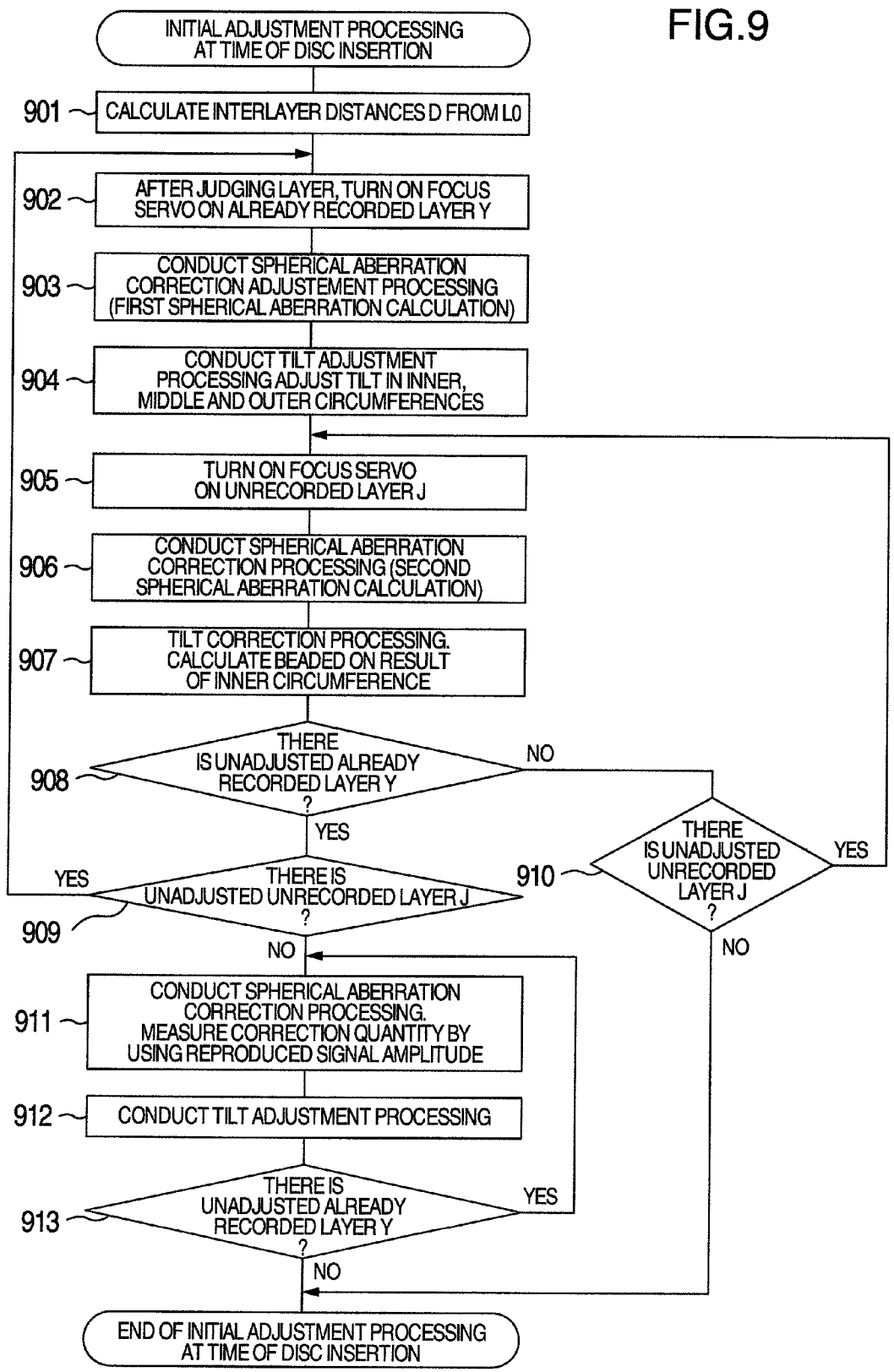
FIG. 9 is a flow chart of an initial adjustment processing algorithm in the case where a plurality of reproduction dedicated layers or recording layers already recorded on the whole surface are used for calculation of a first spherical aberration correction quantity and tilt adjustment including middle/outer circumferences.

As shown in FIG. 9, the optical disc apparatus first calculates interlayer distances D of respective layers from L0 in the optical disc D on the basis of values determined by standards, at step 901.

Then at step 902, the optical disc apparatus layer first judges whether there is an already recorded layer Y on the L0 side as compared with an unadjusted unrecorded layer J which is minimum in the interlayer distance D calculated at the step 901. If it is judged that there is an already recorded layer Y on the L0 side as compared with the unadjusted unrecorded layer J which is minimum in the interlayer distance D, then the optical disc apparatus brings about a state in which the focus servo is applied to an already recorded layer Y which is maximum in the interlayer distance D. On the other hand, if it is judged that there isn't an already recorded layer Y on the L0 side as compared with the unadjusted unrecorded layer J which is minimum in the interlayer distance D, then the optical disc apparatus brings about a state in which the focus servo is applied to an already recorded layer Y which is minimum in the interlayer distance D.

If the step 902 is finished, then the processing proceeds to step 903. At the step 903, the optical disc apparatus conducts spherical aberration correction processing on the already recorded layer Y subjected to the focus servo. The spherical aberration correction processing at the step 903 is equivalent to the processing conducted at the steps 203 to 206 shown in FIG. 2.

Then, at step 904, the optical disc apparatus conducts tilt adjustment processing on the already recorded layer Y subjected to the focus servo. The tilt adjustment processing at the step 904 is equivalent to the processing conducted at the steps 402 to 410 in the flow chart shown in FIG. 4.

Then, at step 905, the optical disc apparatus brings about a state in which the focus servo is applied to an unrecorded layer J which is minimum in the interlayer distance D.

At step 906, the optical disc apparatus conducts spherical aberration correction processing on the unrecorded layer J which is minimum in the interlayer distance D. The spherical aberration correction processing at the step 906 is equivalent to the processing conducted at steps 209 to 211 shown in FIG. 2.

At step 907, the optical disc apparatus conducts tilt adjustment processing on the unrecorded layer J which is minimum in the interlayer distance D. The tilt adjustment at the step 907 is equivalent to the processing conducted at the steps 413 to 416 shown in FIG. 4.

At step 908, the optical disc apparatus judges whether there is an unadjusted already recorded layer Y. If it is judged at the step 908 that there is an unadjusted already recorded layer Y, then the processing proceeds to step 909. At the step 909, the optical disc apparatus judges whether there is an unrecorded layer J.

On the other hand, if it is judged at the step 908 that there isn't an unadjusted already recorded layer Y, then the processing proceeds to step 910. At the step 910, the optical disc apparatus judges whether there is an unadjusted unrecorded layer J.

If it is judged at the step 909 that there is an unadjusted unrecorded layer J, then the processing proceeds to the step 902 and adjustment is conducted beginning with the already recorded layer X.

On the other hand, if it is judged at the step 909 that there isn't an unadjusted unrecorded layer J, then the processing proceeds to step 911. At the step 911, the optical disc apparatus conducts spherical aberration correction processing on the unadjusted already recorded layer Y. The spherical aberration correction processing at the step 911 is equivalent to the processing conducted at the steps 203 and 204 shown in FIG. 2.

If it is judged at the step 910 that there is an unadjusted unrecorded layer J, then the processing proceeds to the step 905 and the optical disc apparatus conducts adjustment on the unadjusted unrecorded layer J.

On the other hand, if it is judged at the step 910 that there isn't an unadjusted unrecorded layer J, then the optical disc apparatus finishes the initial adjustment sequence conducted at the time of disc insertion.

After the end of the step 911, the processing proceeds to step 912. At the step 912, the optical disc apparatus conducts tilt adjustment using the reproduced signal amplitude in the inner circumference. The tilt adjustment processing at the step 912 is equivalent to the processing conducted at the steps 709 and 710 shown in FIG. 7.

Then, the processing proceeds to step 913. At the step 913, the optical disc apparatus judges whether there is an unadjusted already recorded layer Y.

If it is judged at the step 913 that there is an unadjusted already recorded layer Y, then the processing proceeds to step 911 and the spherical aberration correction is conducted on the unadjusted already recorded layer Y again. The processing is repeated until adjustment on all already recorded layers is finished.

On the other hand, if it is judged at the step 913 that there isn't an unadjusted already recorded layer Y, then the optical disc apparatus finishes the initial adjustment learning at the time of disc adjustment.

Heretofore, the case where a plurality of already recorded layers Y are used for the calculation of the first spherical aberration correction quantity and tilt adjustment including the middle circumference and the outer circumference, in the initial adjustment sequence at the time of disc insertion has been described. In the adjustment shown in the embodiment, a calculation result based on adjustment values in a layer closer to an adjustment object in a multiplayer disc is used. As a result, precision of the adjustment values obtained by the calculation is improved.

In general, the multilayer disc is generated by stacking layers from the L0 side. In view of this, the influence of dispersion of intervals between layers caused by layer stacking in the disc production process can be suppressed by using calculation values based on the already recorded layer Y which exists on the L0 side as compared with the adjustment object layer as described in the present embodiment.

Definitions of the optical discs in embodiments ranging from the first embodiment to the fourth embodiment described heretofore are put together in FIG. 10. "Calculation layer" refers to a layer in which a correction value is found by calculation, and "reference layer" refers to a layer in which adjustment used as reference of the calculation is conducted.

In the optical disc apparatuses according to respective embodiments, the spherical aberration correction and the tilt adjustment are effective to improve the recording-reproducing performance. In the case where both corrections are conducted in the multilayer disc, time shortening according to the present invention is possible. Especially, an excellent effect is obtained in time shortening of spherical aberration correction and improving the correction precision of the tilt adjustment for a disc having a mixture of a reproduction dedicated layer and a recording layer in one sheet of an optical disc medium.

In the case where both the spherical aberration correction and the tilt adjustment are conducted in the adjustment sequence at the time of disc insertion, the adjustment time of the whole of the spherical aberration correction and the tilt adjustment can be shortened.

The present invention is not restricted to the embodiments, but various modifications are included. For example, the embodiments have been described in detail to describe the present invention intelligibly, and each embodiment is not restricted to one having all described configurations. Furthermore, a part of a configuration of a certain embodiment can be replaced with a configuration of another embodiment. It is also possible to add a configuration of a certain embodiment to that of another embodiment. It is possible to conduct, with respect to a part of a configuration of each embodiment, addition, deletion or substitution of another configuration.

A part or the whole of each of the configurations may be formed of hardware or may be configured so as to be implemented by executing a program in the processor. As for control lines and information lines, those considered to be necessary are shown, and all control lines and information lines in the product are not necessarily shown. As a matter of fact, it is also possible to consider that almost all configurations are connected to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for conducting information recording or reproduction on an optical disc, the optical disc apparatus comprising:
    an object lens for focusing laser light;
    a drive part for driving the object lens;
    a light sensing part for sensing reflected light from the optical disc;
    a spherical aberration correction part for correcting spherical aberration; and
    an acquisition part for acquiring a correction quantity of the spherical aberration, wherein the acquisition part calculates and acquires the spherical aberration correction quantity of the first layer on the basis of the spherical aberration correction quantity adjusted in the second layer and an interlayer distance determined by standards,
    wherein if an attached optical disc is an optical disc comprising at least one first layer which is an unrecorded or additionally recordable recording layer and comprising at least one second layer which is a recording layer having a place already recorded even partially or a reproduction dedicated layer, then the acquisition part acquires a spherical aberration correction quantity of the second layer on the basis of reflected light from the second layer and acquires a spherical aberration correction quantity of the first layer on the basis of the spherical aberration correction quantity of the second layer.

2. An optical disc apparatus for conducting information recording or reproduction on an optical disc, the optical disc apparatus comprising:
    an object lens for focusing laser light;
    a drive part for driving the object lens;
    a light sensing part for sensing reflected light from the optical disc;
    a spherical aberration correction part for correcting spherical aberration, wherein
    the spherical aberration correction quantity of the first layer obtained on the basis of the spherical aberration correction quantity of the second layer is set as an initial correction quantity, and if the first layer hasn't data recorded therein, then the acquisition part records data in a trial write region in the first layer by using the initial correction quantity as the spherical aberration correction quantity, and acquires the spherical aberration correction quantity of the first layer on the basis of reflected light from the trial write region; and
    an acquisition part for acquiring a correction quantity of the spherical aberration, wherein if an attached optical disc is an optical disc comprising at least one first layer which is an unrecorded or additionally recordable recording layer and comprising at least one second layer which is a recording layer having a place already recorded even partially or a reproduction dedicated layer, then the acquisition part acquires a spherical aberration correction quantity of the second layer on the basis of reflected light from the second layer and acquires a spherical aberration correction quantity of the first layer on the basis of the spherical aberration correction quantity of the second layer.

3. An optical disc apparatus for conducting information recording or reproduction on an optical disc, the optical disc apparatus comprising:

an object lens for focusing laser light;

a drive part for driving the object lens;

a light sensing part for sensing reflected light from the optical disc;

a tilt correction part for correcting tilt; and an acquisition part for acquiring a correction quantity of the tilt, wherein the acquisition part acquires the tilt correction quantity of the first layer on the basis of a ratio of a tilt correction quantity acquired on the basis of reflected light in a radial position of the first layer where information is already recorded to a tilt correction quantity acquired on the basis of reflected light in the pertinent radial position of the second layer, and a tilt correction quantity in another radial position of the second layer, wherein if the optical disc is an optical disc comprising at least one first layer which is an additionally recordable recording layer having an already recorded place even partially and comprising at least one second layer which is a reproduction dedicated layer or a recording layer already recorded on whole surface, then the acquisition part acquires a tilt correction quantity of the second layer on the basis of reflected light from the second layer and acquires a tilt correction quantity of the first layer on the basis of the tilt correction quantity of the second layer.

4. An optical disc apparatus for conducting information recording or reproduction on an optical disc, the optical disc apparatus comprising:

an object lens for focusing laser light;

a drive part for driving the object lens;

a light sensing part for sensing reflected light from the optical disc;

a spherical aberration correction part for correcting spherical aberration, wherein the spherical aberration correction quantity of the first layer acquired on the basis of the spherical aberration correction quantity of the second layer is set as an initial correction quantity;

a tilt correction part for correcting tilt; and an acquisition part for acquiring a correction quantity of the spherical aberration and a correction quantity of the tilt, wherein if the optical disc is an optical disc comprising at least one first layer which is an unrecorded or additionally recordable recording layer and comprising at least one second layer which is a reproduction dedicated layer or a recording layer already recorded on whole surface, then the acquisition part acquires the tilt correction quantity and the spherical aberration correction quantity of the second layer on the basis of reflected light from the second layer, acquires the tilt correction quantity of the first layer on the basis of the tilt correction quantity of the second layer, and acquires the spherical aberration correction quantity of the first layer on the basis of the spherical aberration correction quantity of the second layer, and if the first layer hasn't a recorded region, then the acquisition part records data in a trial write region in the first layer by using the initial correction quantity as a correction quantity of the spherical aberration correction part, and acquires the spherical aberration correction quantity of the first layer on the basis of reflected light obtained from the trial write region in the first layer.

5. An optical disc apparatus for conducting information recording or reproduction on an optical disc, the optical disc apparatus comprising:

an object lens for focusing laser light;

a drive part for driving the object lens;

a light sensing part for sensing reflected light from the optical disc;

a spherical aberration correction part for correcting spherical aberration;

a tilt correction part for correcting tilt; and an acquisition part for acquiring a correction quantity of the spherical aberration and a correction quantity of the tilt, wherein based on tilt correction quantities acquired on the basis of reflected light in a plurality of radial positions in the second layer and tilt correction quantities obtained on the basis of reflected light in an already recorded region in the first layer, the acquisition part acquires a tilt correction quantity in another radial position in the first layer, and wherein if the optical disc is an optical disc comprising at least one first layer which is an unrecorded or additionally recordable recording layer and comprising at least one second layer which is a reproduction dedicated layer or a recording layer already recorded on whole surface, then the acquisition part acquires the tilt correction quantity and the spherical aberration correction quantity of the second layer on the basis of reflected light from the second layer, acquires the tilt correction quantity of the first layer on the basis of the tilt correction quantity of the second layer, and acquires the spherical aberration correction quantity of the first layer on the basis of the spherical aberration correction quantity of the second layer.

6. An optical disc apparatus for conducting information recording or reproduction on an optical disc, the optical disc apparatus comprising:

an object lens for focusing laser light;

a drive part for driving the object lens;

a light sensing part for sensing reflected light from the optical disc;

a spherical aberration correction part for correcting spherical aberration;

a tilt correction part for correcting tilt; and an acquisition part for acquiring a correction quantity of the spherical aberration and a correction quantity of the tilt, wherein if the optical disc is an optical disc comprising at least one first layer which is an unrecorded or additionally recordable recording layer and comprising at least one second layer which is a reproduction dedicated layer or a recording layer already recorded on whole surface, then the acquisition part acquires the tilt correction quantity and the spherical aberration correction quantity of the second layer on the basis of reflected light from the second layer, acquires the tilt correction quantity of the first layer on the basis of the tilt correction quantity of the second layer, and acquires the spherical aberration correction quantity of the first layer on the basis of the spherical aberration correction quantity of the second layer, wherein
if the optical disc comprises a plurality of second layers, the plurality of second layers are set as reference layers, and
when acquiring a tilt correction quantity of the first layer, the acquisition part acquires a tilt correction quantity of the first layer on the basis of a spherical aberration correction quantity and a tilt correction quantity in a reference layer which is included in the reference layers and which is minimum in interlayer distance from the first layer.

* * * * *